(12) United States Patent
Nishio et al.

(10) Patent No.: US 12,454,736 B2
(45) Date of Patent: Oct. 28, 2025

(54) COLD-ROLLED STEEL SHEET AND METHOD FOR MANUFACTURING SAME

(71) Applicant: NIPPON STEEL CORPORATION, Tokyo (JP)

(72) Inventors: Takuya Nishio, Tokyo (JP); Ryosuke Nakamura, Tokyo (JP); Masafumi Azuma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 128 days.

(21) Appl. No.: 18/273,950

(22) PCT Filed: Mar. 1, 2022

(86) PCT No.: PCT/JP2022/008569
§ 371 (c)(1),
(2) Date: Jul. 24, 2023

(87) PCT Pub. No.: WO2022/190959
PCT Pub. Date: Sep. 15, 2022

(65) Prior Publication Data
US 2024/0417820 A1    Dec. 19, 2024

(30) Foreign Application Priority Data

Mar. 10, 2021 (JP) ................... 2021-038716

(51) Int. Cl.
| | | |
|---|---|---|
| B32B 15/00 | (2006.01) |
| B32B 15/01 | (2006.01) |
| C21D 1/18 | (2006.01) |
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/22 | (2006.01) |
| C22C 38/38 | (2006.01) |
| C23C 2/02 | (2006.01) |
| C23C 2/28 | (2006.01) |
| C23C 2/40 | (2006.01) |

(52) U.S. Cl.
CPC .............. *C21D 9/46* (2013.01); *B32B 15/013* (2013.01); *C21D 1/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/38* (2013.01); *C23C 2/0224* (2022.08); *C23C 2/285* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2008/0000555 A1 | 1/2008 | Nonaka et al. | |
| 2013/0087253 A1* | 4/2013 | Matsuda | C23C 2/28 148/333 |
| 2015/0376730 A1* | 12/2015 | Shuto | C22C 38/38 148/333 |
| 2021/0010115 A1 | 1/2021 | Yoshitomi et al. | |
| 2021/0062288 A1 | 3/2021 | Nishio et al. | |

FOREIGN PATENT DOCUMENTS

| | | | | |
|---|---|---|---|---|
| JP | 2006-104532 A | 4/2006 | | |
| JP | 2009-30091 A | 2/2009 | | |
| JP | 2010-215958 A | 9/2010 | | |
| JP | 6295893 B2 * | 3/2018 | | |
| WO | WO-2019181950 A1 * | 9/2019 | ........... | B32B 15/013 |

* cited by examiner

*Primary Examiner* — Mary I Omori
(74) *Attorney, Agent, or Firm* — Birch, Stewart, Kolasch & Birch, LLP

(57) ABSTRACT

This cold-rolled steel sheet has a predetermined chemical composition, in which a metallographic structure of a t/4 portion, which is at a ¼ position of a sheet thickness t from a surface of the cold-rolled steel sheet in a sheet thickness direction, includes, by volume percentage, retained austenite: 2.5% or more and 10.0% or less, tempered martensite: 80.0% or more and 97.5% or less, ferrite and bainite: 0.0% or more and 15.0% or less in total, and martensite: 0.0% or more and 3.0% or less, and in a surface layer area at a position 25 μm away from the surface in the sheet thickness direction, an amount of solute Si is 0.30% or more and 1.50% or less by mass %, a volume percentage of ferrite in the metallographic structure is 0.0% or more and 20.0% or less, and a density of ferrite grains having a grain size of 15 μm or more is 0 grains/mm² or more and 3,000 grains/mm² or less.

15 Claims, No Drawings

COLD-ROLLED STEEL SHEET AND METHOD FOR MANUFACTURING SAME

TECHNICAL FIELD OF THE INVENTION

The present invention relates to a cold-rolled steel sheet and a method for manufacturing the same.

Priority is claimed on Japanese Patent Application No. 2021-038716, filed Mar. 10, 2021, the content of which is incorporated herein by reference.

RELATED ART

Today, as industrial technology fields are highly divided, materials used in each technology field require special and advanced performance. In particular, with regard to steel sheets for a vehicle, in order to reduce a weight of a vehicle body and improve fuel efficiency in consideration of the global environment, there is a significantly increasing demand for cold rolled high tensile strength steel sheets having a small sheet thickness and excellent formability. Among the steel sheets for a vehicle, particularly for cold-rolled steel sheets used for vehicle body frame components, high strength is required, and furthermore, high formability for wide applications is required. Examples of properties required for a steel sheet for a vehicle include a tensile strength (TS) of 1,310 MPa or more and a uniform elongation of 5.0% or more. Further, depending on a processing method and an applied component, it is also required that a limit bend radius R (R/t) standardized by a sheet thickness t in 90° V-bending is 5.0 or less and that hydrogen embrittlement resistance is excellent.

Although it is effective to provide a structure containing ferrite in order to secure ductility such as uniform elongation, a secondary phase needs to be hardened to obtain a strength of 1,310 MPa or more with the structure containing ferrite. However, a hard secondary phase deteriorates bendability.

On the other hand, as a technique for improving bendability and hydrogen embrittlement resistance of a high strength steel sheet, a steel sheet containing tempered martensite as a primary phase has been proposed (refer to, for example, Patent Document 1 and Patent Document 2). In Patent Document 1 and Patent Document 2, it is disclosed that excellent bendability is achieved by providing a structure having a single phase of tempered martensite as a microstructure, and excellent hydrogen embrittlement resistance is achieved by providing a structure in which carbides, which are hydrogen trapping sites, are finely dispersed.

In addition, Patent Document 3 proposes a steel sheet using a TRIP effect caused by retained austenite as a technique for achieving both high-strengthening and high formability.

PRIOR ART DOCUMENT

Patent Document

[Patent Document 1] Japanese Unexamined Patent Application, First Publication No. 2009-30091
[Patent Document 1] Japanese Unexamined Patent Application, First Publication No. 2010-215958
[Patent Document 4] Japanese Unexamined Patent Application, First Publication No. 2006-104532

DISCLOSURE OF THE INVENTION

Problems to be Solved by the Invention

However, the steel sheet of Patent Document 1 has a tensile strength as low as less than 1,310 MPa. Therefore, in a case of aiming for further high-strengthening, it is necessary to further improve workability, bendability, and hydrogen embrittlement resistance that deteriorate accordingly.

In addition, although the steel sheet of Patent Document 2 can achieve a strength as high as 1,310 MPa or more, since the steel sheet is cooled to near room temperature during cooling during quenching, there is a problem in that a volume percentage of retained austenite is small and high uniform elongation cannot be obtained.

In addition, since the steel sheet of Patent Document 3 has ferrite, it is difficult to obtain a strength as high as 1,310 MPa or more, and a strength difference in the structure causes deterioration in bendability with high-strengthening.

That is, it cannot be said that the steel sheets that have been proposed in the related art have high strength and sufficient uniform elongation, bendability, and hydrogen embrittlement resistance to meet the more advanced requirements in recent years.

Therefore, an object of the present invention is to provide a cold-rolled steel sheet having high strength and excellent uniform elongation, bendability, and hydrogen embrittlement resistance, and a method for manufacturing the same.

Means for Solving the Problem

The present inventors studied effects of a chemical composition, a metallographic structure, and manufacturing conditions on strength, uniform elongation, bendability, and hydrogen embrittlement resistance of a cold-rolled steel sheet.

As a result, it was found that the strength, uniform elongation, bendability, and hydrogen embrittlement resistance can be simultaneously improved by controlling a metallographic structure inside a steel sheet (for example, at a ¼ position of a sheet thickness from a surface of the steel sheet) primarily containing tempered martensite with a predetermined amount of retained austenite or more, and then controlling an amount of solute Si and a presence state of ferrite in a surface layer area.

In addition, as a result of studies by the present inventors, it was found that in order to control the surface layer area, grain size refinement and carbide refinement by shear force during hot rolling, suppression of generation of a Si-depleted layer due to internal oxidation by controlling a coiling temperature, and suppression of Si partitioning during annealing by controlling cold rolling and annealing conditions are particularly important.

The present invention has been made based on the above findings. The gist of the present invention is as follows.

[1] A cold-rolled steel sheet according to an aspect of the present invention includes, as a chemical composition, by mass %: C: 0.140% or more and 0.400% or less; Si: 0.35% or more and 1.50% or less; Mn: 1.30% or more and 3.50% or less; P: 0% or more and 0.100% or less; S: 0% or more and 0.010% or less; Al: 0% or more and 0.100% or less; N: 0% or more and 0.0100% or less; Ti: 0% or more and 0.050% or less; Nb: 0% or more and 0.050% or less; V: 0% or more and 0.50% or less; Cu: 0% or more and 1.00% or less; Ni: 0% or more and 1.00% or less; Cr: 0% or more and 1.00% or less; Mo: 0% or more and 0.50% or less; B: 0% or more and 0.0100% or less; Ca: 0% or more and 0.010% or less; Mg: 0% or more and 0.0100% or less; REM: 0% or more and 0.050% or less; Bi: 0% or more and 0.050% or less; and a remainder of Fe and impurities, in which a metallographic structure of a t/4 portion, which is at a ¼ position of a sheet thickness t from a surface of the cold-rolled steel sheet in a sheet thickness direction, includes, by volume percentage, retained austenite: 2.5% or more and 10.0% or less, tempered martensite: 80.0% or more and 97.5% or less, ferrite and bainite: 0.0% or more and 15.0% or less in total, and martensite: 0.0% or more and 3.0% or less, and in a surface layer area at a position 25 μm away from the surface in the sheet thickness direction, an amount of solute Si is 0.30% or more and 1.50% or less by mass %, a volume percentage of ferrite in a metallographic structure is 0.0% or more and 20.0% or less, and a density of ferrite grains having a grain size of 15 μm or more is 0 grains/mm$^2$ or more and 3,000 grains/mm$^2$ or less.

[2] The cold-rolled steel sheet according to [1] may include, as the chemical composition, by mass %, one or two or more selected from the group consisting of: Ti: 0.001% or more and 0.050% or less; Nb: 0.001% or more and 0.050% or less; V: 0.01% or more and 0.50% or less; Cu: 0.01% or more and 1.00% or less; Ni: 0.01% or more and 1.00% or less; Cr: 0.01% or more and 1.00% or less; Mo: 0.01% or more and 0.50% or less; B: 0.0001% or more and 0.0100% or less; Ca: 0.0001% or more and 0.010% or less; Mg: 0.0001% or more and 0.0100% or less; REM: 0.0005% or more and 0.050% or less; and Bi: 0.0005% or more and 0.050% or less.

[3] In the cold-rolled steel sheet according to [1] or [2], a ratio of the amount of solute Si in the surface layer area to an amount of solute Si in the t/4 portion may be 0.85 to 1.10.

[4] In the cold-rolled steel sheet according to any one of [1] to [3], a tensile strength of the cold-rolled steel sheet may be 1,310 MPa or more, a uniform elongation of the cold-rolled steel sheet may be 5.0% or more, and R/t, which is a value obtained by dividing a limit bend radius R in 90° V-bending by the sheet thickness t, may be 5.0 or less.

[5] In the cold-rolled steel sheet according to [4], the tensile strength may be 1,400 MPa or more.

[6] In the cold-rolled steel sheet according to any one of [1] to [5], a hot-dip galvanized layer may be formed on the surface.

[7] In the cold-rolled steel sheet according to [6], the hot-dip galvanized layer may be a hot-dip galvannealed layer.

[8] A method for manufacturing a cold-rolled steel sheet according to another aspect of the present invention, includes: a hot rolling process of heating, as necessary, a cast slab containing, as a chemical composition, by mass %, C: 0.140% or more and 0.400% or less, Si: 0.35% or more and 1.50% or less, Mn: 1.30% or more and 3.50% or less, P: 0% or more and 0.100% or less, S: 0% or more and 0.010% or less, Al: 0% or more and 0.100% or less, N: 0% or more and 0.0100% or less, Ti: 0% or more and 0.050% or less, Nb: 0% or more and 0.050% or less, V: 0% or more and 0.50% or less, Cu: 0% or more and 1.00% or less, Ni: 0% or more and 1.00% or less, Cr: 0% or more and 1.00% or less, Mo: 0% or more and 0.50% or less, B: 0% or more and 0.0100% or less, Ca: 0% or more and 0.010% or less, Mg: 0% or more and 0.0100% or less, REM: 0% or more and 0.050% or less, Bi: 0% or more and 0.050% or less, and a remainder of Fe and impurities, and performing hot rolling on the cast slab under conditions in which a rolling temperature FT in a final stand is 960° C. or lower, a rolling reduction in the final stand is 10% or more, and a friction coefficient μ in the final stand is 0.15 or more to obtain a hot-rolled steel sheet; a coiling process of cooling the hot-rolled steel sheet to a coiling temperature of 560° C. or higher and 650° C. or lower and coiling the hot-rolled steel sheet at the coiling temperature; a cold rolling process of performing cold rolling on the hot-rolled steel sheet after the coiling process under a condition in which a cumulative rolling reduction is 60% or less to obtain a cold-rolled steel sheet; an annealing process of heating the cold-rolled steel sheet to a soaking temperature of 820° C. or higher so that an average heating rate up to 750° C. becomes 3.0° C./sec or faster, and holding the cold-rolled steel sheet at the soaking temperature; a post-annealing cooling process of cooling the cold-rolled steel sheet after the annealing process to a temperature of 50° C. or higher and 250° C. or lower so that average cooling rates in a temperature range of 700° C. to 600° C. and in a temperature range of 450° C. to 350° C. are 5.0° C./sec or faster; and a tempering process of holding the cold-rolled steel sheet after the post-annealing cooling process at 200° C. or higher and 350° C. or lower for 1 second or longer, in which a temperature of the hot-rolled steel sheet after the hot rolling process is caused to reach 500° C. or lower within 10 hours from completion of the hot rolling process.

[9] In the method for manufacturing a cold-rolled steel sheet according to [8], the cast slab may contain, as the chemical composition, by mass %, one or two or more selected from the group consisting of: Ti: 0.001% or more and 0.050% or less; Nb: 0.001% or more and 0.050% or less; V: 0.01% or more and 0.50% or less; Cu: 0.01% or more and 1.00% or less; Ni: 0.01% or more and 1.00% or less; Cr: 0.01% or more and 1.00% or less; Mo: 0.01% or more and 0.50% or less; B: 0.0001% or more and 0.0100% or less; Ca: 0.0001% or more and 0.010% or less; Mg: 0.0001% or more and 0.0100% or less; REM: 0.0005% or more and 0.050% or less; and Bi: 0.0005% or more and 0.050% or less.

[10] In the method for manufacturing a cold-rolled steel sheet according to [8] or [9], in the post-annealing cooling process, the cold-rolled steel sheet may be immersed in a plating bath in a state where a temperature of the cold-rolled steel sheet is higher than 425° C. and lower than 600° C. to form a hot-dip galvanized layer on a surface of the cold-rolled steel sheet.

[11] In the method for manufacturing a cold-rolled steel sheet according to [10], an alloying treatment for alloying the hot-dip galvanized layer may be performed in the post-annealing cooling process.

Effects of the Invention

According to the above aspect of the present invention, it is possible to provide a cold-rolled steel sheet having high strength and excellent uniform elongation, bendability, and hydrogen embrittlement resistance, and a method for manufacturing the same.

EMBODIMENTS OF THE INVENTION

A cold-rolled steel sheet according to an embodiment of the present invention (a cold-rolled steel sheet according to the present embodiment) and a method for manufacturing the same will be described.

The cold-rolled steel sheet according to the present embodiment has (a) a chemical composition described below, in which (b) a metallographic structure of a t/4 portion, which is at a ¼ position of a sheet thickness t from a surface of the cold-rolled steel sheet in a sheet thickness direction, includes, by volume percentage, retained austenite: 2.5% or more and 10.0% or less, tempered martensite:

80.0% or more and 97.5% or less, ferrite and bainite: 0.0% or more and 15.0% or less in total, and martensite: 0.0% or more and 3.0% or less, and (c) in a surface layer area at a position 25 µm away from the surface in the sheet thickness direction, an amount of solute Si is 0.30% or more and 1.50% or less by mass %, a volume percentage of ferrite in the metallographic structure is 0.0% or more and 20.0% or less, and a density of ferrite grains having a grain size of 15 µm or more is 0 grains/mm$^2$ or more and 3,000 grains/mm$^2$ or less.

The cold-rolled steel sheet according to the present embodiment includes not only a cold-rolled steel sheet having no plating layer on the surface, but also a hot-dip galvanized steel sheet having a hot-dip galvanized layer on the surface or a hot-dip galvannealed steel sheet having a hot-dip galvannealed layer on the surface, and these main conditions are common to the hot-dip galvanized steel sheet and the hot-dip galvannealed steel sheet.

However, in a case of a plated steel sheet, a surface as a reference indicating a position defining a metallographic structure means a surface of a base steel sheet excluding plating.

Each will be described below.

<Chemical Composition>

First, the chemical composition of the cold-rolled steel sheet according to the present embodiment will be described. Hereinafter, "%" indicating an amount of each element in the chemical composition means "mass %" unless otherwise specified.

C: 0.140% or More and 0.400% or Less

When a C content is less than 0.140%, it becomes difficult to obtain the above-described metallographic structure, and a desired tensile strength cannot be achieved. In addition, bendability decreases. Therefore, the C content is set to 0.140% or more. The C content is preferably more than 0.140%, more preferably 0.160% or more, and even more preferably 0.180% or more.

On the other hand, when the C content is more than 0.400%, weldability deteriorates and the bendability deteriorates. In addition, hydrogen embrittlement resistance also deteriorates. Therefore, the C content is set to 0.400% or less. The C content is preferably less than 0.400%, more preferably 0.350% or less, and even more preferably 0.300% or less.

Si: 0.35% or More and 1.50% or Less

Si is an element useful for increasing strength of the steel sheet by solid solution strengthening. In addition, Si suppresses the generation of cementite, and is thus an element effective in promoting the concentration of C in austenite and generating retained austenite after annealing. When a Si content is less than 0.35%, it becomes difficult to obtain the effect of the above action, it becomes difficult to achieve a target uniform elongation, and the hydrogen embrittlement resistance deteriorates. Therefore, the Si content is set to 0.35% or more. The Si content is preferably more than 0.35%, more preferably 0.40% or more, and even more preferably 0.45% or more.

On the other hand, when the Si content is more than 1.50%, austenitic transformation during heating in an annealing step slows down, and there are cases where transformation from ferrite to austenite does not occur sufficiently. In this case, an excessive amount of ferrite remains in the microstructure after annealing, and a target tensile strength cannot be achieved, so that the bendability deteriorates. In addition, when the Si content is more than 1.50%, surface properties of the steel sheet deteriorate. Furthermore, chemical convertibility and platability significantly deteriorate. Therefore, the Si content is set to 1.50% or less. The Si content is preferably less than 1.50%, more preferably 1.25% or less, even more preferably 1.00% or less, and still more preferably 0.90% or less or 0.85% or less. In particular, when the Si content is set to 1.00% or less, plating adhesion is improved.

Mn: 1.30% or More and 3.50% or Less

Mn has an action of improving hardenability of steel and is an effective element for obtaining a desired metallographic structure described below. When a Mn content is less than 1.30%, it becomes difficult to obtain a desired metallographic structure. In this case, a sufficient tensile strength cannot be obtained. Therefore, the Mn content is set to 1.30% or more. The Mn content is preferably more than 1.30%, more preferably 1.50% or more, and even more preferably 2.00% or more.

On the other hand, when the Mn content is more than 3.50%, an effect of improving the hardenability is diminished due to segregation of Mn, and a material cost increases. Therefore, the Mn content is set to 3.50% or less. The Mn content is preferably less than 3.50%, more preferably 3.25% or less, and even more preferably 3.00% or less.

P: 0% or More and 0.100% or Less

P is an element contained in steel as an impurity and is an element that segregates at grain boundaries and embrittles steel. Therefore, a P content is preferably as small as possible and may be 0%. However, in consideration of a time and a cost for removing P, the P content is set to 0.100% or less. The P content is preferably 0.020% or less, and more preferably 0.015% or less. The P content may be set to 0.005% or more in consideration of a refining cost or the like.

S: 0% or More and 0.010% or Less

S is an element contained in steel as an impurity and is an element that forms sulfide-based inclusions and deteriorates the bendability. Therefore, a S content is preferably as small as possible and may be 0%. However, in consideration of a time and a cost for removing S, the S content is set to 0.010% or less. The S content is preferably 0.005% or less, more preferably 0.003% or less, and even more preferably 0.001% or less. The S content may be set to 0.0001% or more in consideration of the refining cost or the like.

Al: 0% or More and 0.100% or Less

Al is an element having an action of deoxidizing molten steel. In a case where Al is contained for the purpose of deoxidation, an Al content is preferably 0.005% or more, and more preferably 0.010% or more in order to reliably achieve the deoxidation. In addition, Al has an action of enhancing stability of austenite like Si and is an effective element for obtaining the above-described metallographic structure. Therefore, Al may be contained. In a case where Al is contained, the Al content may be, for example, 0.010% or more.

On the other hand, when the Al content is too high, not only are surface defects caused by alumina likely to occur, but also a transformation point significantly increases, so that the volume percentage of ferrite increases. In this case, it becomes difficult to obtain the above-mentioned metallographic structure, and a sufficient tensile strength cannot be obtained. Therefore, the Al content is set to 0.100% or less. The Al content is preferably 0.050% or less, more preferably 0.040% or less, and even more preferably 0.030% or less. In the cold-rolled steel sheet according to the present embodiment, since Si having a deoxidizing action is contained like Al, Al does not necessarily have to be contained, and the Al content may be 0%.

N: 0% or More and 0.0100% or Less

N is an element that can be contained in steel as an impurity and is an element that forms coarse precipitates and deteriorates the bendability. Therefore, a N content is set to 0.0100% or less. The N content is preferably 0.0060% or less, and more preferably 0.0050% or less. The N content is preferably as small as possible, and may be 0%. The N content may be set to 0.0010% or more or 0.0020% or more in consideration of the refining cost or the like.

The cold-rolled steel sheet according to the present embodiment contains the above-mentioned elements and a remainder being Fe and impurities, and may further contain one or two or more of elements listed below that affect the strength and the bendability as optional elements. However, since the optional elements do not necessarily have to be contained, lower limits of all thereof are 0%.

Ti: 0% or More and 0.050% or Less
Nb: 0% or More and 0.050% or Less
V: 0% or More and 0.50% or Less
Cu: 0% or More and 1.00% or Less Ti, Nb, V, and Cu are elements having an action of improving the strength of the steel sheet by precipitation hardening. Therefore, these elements may be contained. In order to sufficiently obtain the above effects, it is preferable that a Ti content and a Nb content are each set to 0.001% or more, and a V content and a Cu content are each set to 0.01% or more. The Ti content and the Nb content are each more preferably 0.005% or more, and the V content and the Cu content are each more preferably 0.05% or more. It is not essential to obtain the above effects. Therefore, it is not necessary to particularly limit lower limits of the Ti content, the Nb content, the V content, and the Cu content, and the lower limits thereof are 0%.

On the other hand, when these elements are excessively contained, a recrystallization temperature rises, the metallographic structure of the cold-rolled steel sheet becomes non-uniform, and the bendability is impaired. Therefore, in a case where these elements are contained, the Ti content is set to 0.050% or less, the Nb content is set to 0.050% or less, the V content is set to 0.50% or less, and the Cu content is set to 1.00% or less. The Ti content is preferably less than 0.050%, more preferably 0.030% or less, and even more preferably 0.020% or less. The Nb content is preferably less than 0.050%, more preferably 0.030% or less, and even more preferably 0.020% or less. The V content is preferably 0.30% or less. The Cu content is preferably 0.50% or less.

Ni: 0% or More and 1.00% or Less
Cr: 0% or More and 1.00% or Less
Mo: 0% or More and 0.50% or Less
B: 0% or More and 0.0100% or Less Ni, Cr, Mo, and B are elements that improve the hardenability and contribute to high-strengthening of the steel sheet, and are effective elements for obtaining the above-described metallographic structure. Therefore, these elements may be contained. In order to sufficiently obtain the above effects, it is preferable that a Ni content, a Cr content, and a Mo content are each set to 0.01% or more, and/or a B content is set to 0.0001% or more. More preferably, the Ni content, the Cr content, and the Mo content are each 0.05% or more, and the B content is 0.0010% or more. It is not essential to obtain the above effects. Therefore, it is not necessary to particularly limit lower limits of the Ni content, the Cr content, the Mo content, and the B content, and the lower limits thereof are 0%.

On the other hand, even if these elements are excessively contained, the effect of the above-described action is saturated, which is uneconomical. Therefore, in a case where these elements are contained, the Ni content and the Cr content are set to 1.00% or less, the Mo content is set to 0.50% or less, and the B content is set to 0.0100% or less. The Ni content and Cr content are preferably 0.50% or less, the Mo content is preferably 0.20% or less, and the B content is preferably 0.0030% or less.

Ca: 0% or More and 0.010% or Less
Mg: 0% or More and 0.0100% or Less
REM: 0% or More and 0.050% or Less
Bi: 0% or More and 0.050% or Less Ca, Mg, and REM are elements having an action of improving the strength and bendability of the steel sheet by adjusting shapes of inclusions. Bi is an element having an action of improving the strength and bendability by refining a solidification structure. Therefore, these elements may be contained. In order to sufficiently obtain the above effects, it is preferable that a Ca content and a Mg content are each set to 0.00010% or more, and a REM content and a Bi content are each set to 0.0005% or more. More preferably, the Ca content and the Mg content are each 0.00080% or more, and the REM content and the Bi content are each 0.0007% or more. It is not essential to obtain the above effects. Therefore, it is not necessary to particularly limit lower limits of the Ca content, the Mg content, the Bi content, and the REM content, and the lower limits thereof are 0%.

On the other hand, even if these elements are excessively contained, the effect of the above action is saturated, which is uneconomical. Therefore, in a case where these elements are contained, the Ca content is set to 0.010% or less, the Mg content is set to 0.0100% or less, the REM content is set to 0.050% or less, and the Bi content is set to 0.050% or less. Preferably, the Ca content is 0.008% or less or 0.002% or less, the Mg content is 0.0020% or less, the REM content is 0.010% or less or 0.002% or less, and the Bi content is 0.010% or less, REM means rare earth elements and is a generic term for a total of 17 elements of Sc, Y and lanthanides, and the REM content is a total amount of these elements.

<Metallographic Structure at ¼ Position (t/4 Portion) of Sheet Thickness t from Surface in Sheet Thickness Direction>

In a description of the metallographic structure of the cold-rolled steel sheet according to the present embodiment, microstructural fractions are indicated by volume percentages. Therefore, unless otherwise specified, "%" indicates "vol %".

[Retained Austenite: 2.5% or More and 10.0% or Less]

Retained austenite improves ductility of the steel sheet by a TRIP effect and contributes to an improvement in uniform elongation. Therefore, the volume percentage of retained austenite is set to 2.5% or more. The volume percentage of retained austenite is preferably more than 2.5%, more preferably 3.5% or more, and even more preferably 4.5% or more.

On the other hand, when the volume percentage of retained austenite becomes excessive, a grain size of retained austenite increases. Such retained austenite having a large grain size becomes coarse and hard martensite after deformation. In this case, the origin of cracks is likely to occur, and the bendability deteriorates. Therefore, the volume percentage of retained austenite is set to 10.0% or less. The volume percentage of retained austenite is preferably less than 10.0%, more preferably 8.0% or less, and even more preferably 7.0% or less.

[Tempered Martensite: 80.0% or More and 97.5% or Less]

Tempered martensite is an aggregate of lath-shaped grains similar to martensite (so-called fresh martensite). On the other hand, unlike martensite, tempered martensite is a hard microstructure containing fine iron-based carbides inside by tempering. Tempered martensite is obtained by tempering martensite generated by cooling or the like after annealing by a heat treatment or the like.

Tempered martensite is a microstructure that is not brittle and has ductility compared to martensite. In the cold-rolled steel sheet according to the present embodiment, the volume percentage of tempered martensite is set to 80.0% or more in order to improve the strength, bendability, and hydrogen embrittlement resistance. The volume percentage of tempered martensite is preferably 85.0% or more. In order to set the volume percentage of retained austenite to 2.5% or more, the volume percentage of tempered martensite is 97.5% or less.

[Ferrite and Bainite: 0.0% or More and 15.0% or Less in Total]

Ferrite is a soft phase obtained by performing two-phase annealing or performing slow cooling after annealing. In a case where ferrite is mixed with a hard phase such as martensite, the ductility of the steel sheet is improved. However, in order to achieve a strength as high as 1,310 MPa or more, it is necessary to limit the volume percentage of ferrite.

Bainite is a phase obtained by performing holding at 350° C. or higher and 450° C. or lower for a certain period of time after annealing. Bainite is softer than martensite and has an effect of improving the ductility. However, in order to achieve a strength as high as 1,310 MPa or more, it is necessary to limit the volume percentage of bainite as in the case of ferrite described above.

Therefore, the volume percentages of ferrite and bainite are set to 15.0% or less in total. The volume percentages of ferrite and bainite are preferably 10.0% or less. Since ferrite and bainite may not be contained, lower limits thereof are each 0.0%.

In addition, since ferrite is softer than bainite, in a case where the total volume percentage of ferrite and bainite is 15.0% or less, the volume percentage of ferrite is preferably less than 10.0% in order to achieve a strength as high as 1,310 MPa or more.

[Martensite: 0.0% or More and 3.0% or Less]

Martensite (fresh martensite) is an aggregate of lath-shaped grains that may be generated by transformation from austenite during final cooling after a tempering step. Since martensite is hard and brittle and tends to be an origin of cracking during deformation, a large volume percentage of martensite causes the deterioration in the bendability. Therefore, the volume percentage of martensite is set to 3.0% or less. The volume percentage of martensite is preferably 2.0% or less, and more preferably 1.0% or less. Since martensite may not be contained, a lower limit of the volume percentage of martensite is 0.0%.

The metallographic structure at the ¼ position (t/4 portion) of the sheet thickness t from the surface in the sheet thickness direction may contain pearlite as the remainder in the microstructure in addition to the above. However, pearlite is a microstructure having cementite in the microstructure and consumes C (carbon) in steel that contributes to an improvement in strength. When a volume percentage of pearlite is 5.0% or less, the strength of the steel sheet is increased. Therefore, the volume percentage of pearlite is preferably set to 5.0% or less. The volume percentage of pearlite is more preferably 3.0% or less, and even more preferably 1.0% or less.

The volume percentages in the microstructure of the t/4 portion of the cold-rolled steel sheet according to the present embodiment are measured as follows.

That is, the volume percentages of ferrite, bainite, martensite, tempered martensite, and pearlite are measured by a method in which, a test piece is collected from a certain position in a rolling direction of the steel sheet at a center position in a width direction of the steel sheet, a longitudinal section (that is, a cross section parallel to the rolling direction and parallel to the thickness direction) parallel to the rolling direction is polished, and a metallographic structure that is revealed by nital etching at the ¼ position of the sheet thickness t from the surface in the sheet thickness direction is observed using a scanning electron microscope (SEM). In the SEM observation, five visual fields of 30 μm in the sheet thickness direction and 50 μm in the rolling direction are observed at a magnification of 3,000-fold so that the ¼ position of the sheet thickness t from the surface in the sheet thickness direction is at the center. An area ratio of each microstructure is measured from the observed image, and an average value thereof is calculated. Since there is no microstructural change in the direction (steel sheet width direction) perpendicular to the rolling direction and area ratios of the longitudinal section parallel to the rolling direction are equal to volume percentages, the area ratios obtained by the microstructural observation are each used as volume percentages.

In the measurement of the area ratio of each microstructure, a region with no substructure revealed and a low luminance is defined as ferrite. In addition, a region that is a layered structure of ferrite and cementite is defined as pearlite. In addition, a region with no substructure revealed and a high luminance is defined as martensite or retained austenite. In addition, a region in which a substructure is revealed is defined as tempered martensite or bainite.

Bainite and tempered martensite can be distinguished from each other by further carefully observing carbides in the grains.

Specifically, tempered martensite includes martensite laths and cementite generated within the laths. Here, since there are two or more kinds of crystal orientation relationships between martensite laths and cementite, cementite included in the tempered martensite has a plurality of variants. On the other hand, bainite is classified into upper bainite and lower bainite. Upper bainite includes lath-shaped bainitic ferrite and cementite generated at the interface between the laths and can be easily distinguished from tempered martensite. Lower bainite includes lath-shaped bainitic ferrite and cementite generated within the laths. Here, there is one kind of crystal orientation relationship between bainitic ferrite and cementite unlike tempered martensite, and cementite included in lower bainite has the same variant. Therefore, lower bainite and tempered martensite can be distinguished from each other on the basis of the variants of cementite.

On the other hand, martensite and retained austenite cannot be clearly distinguished from each other by the SEM observation. Therefore, the volume percentage of martensite is calculated by subtracting the volume percentage of retained austenite calculated by a method described later from a volume percentage of a microstructure determined to be martensite or retained austenite.

The volume percentage of retained austenite is obtained by collecting a test piece from a certain position in the rolling direction of the steel sheet at a center position in the width direction, chemically polishing a rolled surface from the surface of the steel sheet to the ¼ position of the sheet thickness, and quantifying integrated intensities of (200) and (210) planes of ferrite and (200), (220), and (311) planes of austenite by MoKα radiation.

<Metallographic Structure of Surface Layer Area: Volume Percentage of Ferrite is 0.0% or More and 20.0% or Less and Density of Ferrite Grains Having Grain Size of 15 μm or More is 0 Grains/Mm$^2$ or More and 3,000 Grains/Mm$^2$ or Less>

In the surface layer area at a position 25 μm away from the surface in the sheet thickness direction, when the volume percentage of ferrite is more than 20.0% and the density of ferrite grains having a grain size of 15 μm or more is more than 3,000 grains/mm$^2$, the bendability decreases. On the other hand, in the surface layer area at a position 25 μm away from the surface in the sheet thickness direction, when the volume percentage of ferrite is 20.0% or less and the density of ferrite grains having a grain size of 15 μm or more is 3,000 grains/mm$^2$ or less, the bendability is improved. This is thought to be due to a homogeneous microstructure and improved bendability resulting from fewer soft phases and less coarse soft phases.

Therefore, in the metallographic structure of the surface layer area, the volume percentage of ferrite is set to 20.0% or less, and the density of ferrite grains having a grain size of 15 μm or more is set to 3.000 grains/mm$^2$ or less.

In the metallographic structure of the surface layer area, the volume percentage of ferrite is preferably 18.0% or less, more preferably 15.0% or less, and even more preferably 10.0% or less. In addition, the volume percentage of ferrite may be set to 1.0% or more. In the metallographic structure of the surface layer area, the density of ferrite grains having a grain size of 15 μm or more is preferably 2,500 grains/mm$^2$ or less, and more preferably 2.000 grains/mm$^2$ or less. In addition, the density of ferrite grains having a grain size of 15 μm or more may be set to 100 grains/mm$^2$ or more.

The volume percentage of ferrite in the surface layer area is obtained by collecting a test piece from a certain position in the rolling direction of the steel sheet at a center position in the width direction, polishing a longitudinal section parallel to the rolling direction, and observing a metallographic structure at a position (specifically, a region of 10 to 40 μm from the surface×a region of 50 μm in the rolling direction) 25 μm away from the surface, that is revealed by nital etching, using SEM.

In addition, the density of ferrite grains having a grain size of 15 μm or more is calculated by dividing the number (grains) of ferrite grains having a grain size of 15 μm or more in the cross section observed by the SEM by the observed area (mm$^2$).

<Amount of Solute Si in Surface Layer Area: 0.30 Mass % or More and 1.50 Mass % or Less>

When the amount of solute Si in the surface layer area is less than 0.30 mass %, the strength of soft ferrite decreases, a difference in strength from hard phases increases, and the bendability deteriorates. Therefore, the amount of solute Si in the surface layer area is set to 0.30 mass % or more. The amount of solute Si in the surface layer area is preferably 0.35 mass % or more, and more preferably 0.40 mass % or more.

In addition, when the amount of solute Si in the surface layer area is more than 1.50 mass %, tempering of martensite by reheating after a post-annealing cooling step is delayed, resulting in a hard microstructure and deterioration in the bendability. Therefore, the amount of solute Si in the surface layer area is set to 1.50 mass % or less. The amount of solute Si in the surface layer area is preferably 1.20 mass % or less, more preferably 1.00 mass % or less, and even more preferably 0.90 mass % or less.

In addition, in the cold-rolled steel sheet according to the present embodiment, a ratio of the amount of solute Si in the surface layer area to an amount of solute Si in the t/4 portion is preferably 0.85 to 1.10.

When the ratio between the amount of solute Si in the t/4 portion and the amount of solute Si in the surface layer area is within the above range, the tempering of martensite by the reheating after the post-annealing cooling step is uniformly performed in the sheet thickness direction. Therefore, a uniform structure can be obtained, so that good bendability and hydrogen embrittlement resistance can be obtained. The ratio of the amount of solute Si is preferably 0.87 to 1.05, and more preferably 0.90 to 1.05.

The amount of solute Si in the surface layer area and in the t/4 portion is measured by the following method.

The amount of solute Si is obtained by simultaneously measuring Si and O at a target position with EPMA and performing quantitative analysis. The amount of solute Si is obtained by collecting a test piece from a certain position in the rolling direction of the steel sheet at a center position in the width direction, and performing line analysis of Si and O in the rolling direction with EPMA on a longitudinal section (that is, a cross section parallel to the rolling direction and parallel to the thickness direction) parallel to the rolling direction at a position 25 μm away from the surface and at the ¼ position of the sheet thickness t in the sheet thickness direction. However, in a case where Si and O are simultaneously detected, Si oxides are present, so that a region where O is detected is excluded. This measurement is performed at 10 or more points, and an average value thereof is defined as the amount of solute Si.

<Mechanical Properties>

[Tensile Strength: 1,310 MPa or More]
[Uniform Elongation: 5.0% or More]
[Value (R/t) Obtained by Dividing Limit Bend Radius R in 90° V-Bending by Sheet Thickness t: 5.0 or Less]

In the cold-rolled steel sheet according to the present embodiment, the tensile strength (TS) as a strength that contributes to a reduction in weight of a vehicle body is preferably set to 1,310 MPa or more. From the viewpoint of impact absorption, the tensile strength of the steel sheet is more preferably 1,350 MPa or more, even more preferably 1.400 MPa or more, and still more preferably 1,470 MPa or more. It is not necessary to limit an upper limit of the tensile strength. However, there are cases where an increase in the tensile strength causes a decrease in formability. Therefore, the tensile strength may be set to 1,900 MPa or less.

In addition, from the viewpoint of formability, the uniform elongation (uEl) is preferably set to 5.0% or more. In order to improve the formability, the uniform elongation (uEl) is more preferably 5.5% or more. Although it is not necessary to limit an upper limit of the uniform elongation, the uniform elongation may be set to 30.0% or less or 20.0% or less.

In addition, from the viewpoint of bendability, a value obtained by dividing a limit bend radius R in 90° V-bending by the sheet thickness t (that is, a limit bend radius R standardized by a division by the sheet thickness t) (R/t) is preferably set to 5.0 or less. (R/t) is more preferably 4.0 or less and even more preferably 3.0 or less in order to improve the bendability. (R/t) may be set to 0.5 or more or 1.0 or more.

The tensile strength (TS) and uniform elongation (uEl) are obtained by collecting a JIS No. 5 tensile test piece from the steel sheet in the direction perpendicular to the rolling direction and performing a tensile test according to JIS Z 2241:2011.

The limit bend radius (R/t) standardized according to the sheet thickness is obtained by obtaining a minimum bend radius (limit bend radius) R at which no cracking occurs when a 90° V-bending die is used and a radius R is changed at a pitch of 0.5 mm, and dividing the minimum bend radius by the sheet thickness t.

The cold-rolled steel sheet according to the present embodiment may be provided with a hot-dip galvanized layer on the surface. Corrosion resistance is improved by providing a plating layer on the surface. When there is a concern about perforation due to corrosion in a steel sheet for a vehicle, there are cases where the steel sheet cannot be thinned to a certain sheet thickness or less even if the high-strengthening is achieved. One of the purposes of the high-strengthening of the steel sheet is to reduce the weight by thinning. Therefore, even if a high strength steel sheet is developed, an application range of a steel sheet with low corrosion resistance is limited. As a method for solving these problems, it is conceivable to apply plating such as hot-dip galvanizing having high corrosion resistance to the steel sheet. In the cold-rolled steel sheet according to the present embodiment, since the composition of the steel sheet is controlled as described above, hot-dip galvanizing is possible.

The hot-dip galvanized layer may be a hot-dip galvannealed layer.

The hot-dip galvanized layer and the hot-dip galvannealed layer may be plating layers formed by ordinary methods.

<Manufacturing Conditions>

Specifically, the cold-rolled steel sheet according to the present embodiment can be manufactured by a manufacturing method including the following configurations (I) to (VII):

(I) a hot rolling step of heating, as necessary, a cast slab having the above-described chemical composition, and performing hot rolling on the cast slab under conditions in which a rolling temperature FT in a final stand is 960° C. or lower, a rolling reduction in the final stand is 10% or more, and a friction coefficient μ in the final stand is 0.15 or more to obtain a hot-rolled steel sheet;

(II) a coiling step of cooling the hot-rolled steel sheet to a coiling temperature of 560° C. or higher and 650° C. or lower and coiling the hot-rolled steel sheet at the coiling temperature;

(III) a cold rolling step of performing cold rolling on the hot-rolled steel sheet after the coiling step under a condition in which a cumulative rolling reduction is 60% or less to obtain a cold-rolled steel sheet;

(IV) an annealing step of heating the cold-rolled steel sheet to a soaking temperature of 820° C. or higher so that an average heating rate up to 750° C. becomes 3.0° C./sec or faster, and holding the cold-rolled steel sheet at the soaking temperature;

(V) a post-annealing cooling step of cooling the cold-rolled steel sheet after the annealing step to a temperature of 50° C. or higher and 250° C. or lower so that average cooling rates in a temperature range of 700° C. to 600° C. and in a temperature range of 450° C. to 350° C. are 5.0° C./sec or faster; and (VI) a tempering step of holding the cold-rolled steel sheet after the post-annealing cooling step at 200° C. or higher and 350° C. or lower for 1 second or longer, (VII) in which a temperature of the hot-rolled steel sheet after the hot rolling step is caused to reach 500° C. or lower within 10 hours from completion of the hot rolling step.

Hereinafter, each will be described.

[Hot Rolling Step]

In the hot rolling step, the heated cast slab is hot-rolled to obtain the hot-rolled steel sheet. In a case where a temperature of the cast slab is high, the cast slab may be subjected to the hot rolling as it is without being cooled to around room temperature. Slab heating conditions in the hot rolling are not limited, but the cast slab is preferably heated to 1.100° C. or higher. By setting a heating temperature to 1,100° C. or higher, it is possible to avoid insufficient homogenization of materials.

In order to control the metallographic structure and the amount of solute Si of the surface layer area, the rolling temperature (FT) in the finishing final stand (final pass) during the hot rolling is set to 960° C. or lower, the rolling reduction in the final stand is set to 10% or more, and the friction coefficient μ during the rolling in the final stand is set to 0.15 or more. In the hot rolling step, particularly the surface layer area undergoes shear deformation, so that carbides are finely precipitated in the surface layer area in the subsequent coiling step. In this case, by performing the subsequent cold rolling and annealing under predetermined conditions, distribution of a Si concentration in the surface layer is suppressed, and the amount of solute Si and a presence state of ferrite in the surface layer area are preferable.

When the rolling temperature is high, an effect of the shear deformation is reduced, a desired microstructure of a surface layer cannot be formed, and the bendability and hydrogen embrittlement resistance are not sufficiently improved. Therefore, the rolling temperature (FT) in the final stand is set to 960° C. or lower. The rolling temperature in the final stand is preferably 940° C. or lower. Although a lower limit of the rolling temperature of the final stand is not limited, a rolling force increases as the rolling temperature decreases. Therefore, the rolling temperature in the final stand may be set to 870° C. or higher.

In addition, when the rolling reduction of the final stand is low or the friction coefficient during the final stand of rolling is low, the surface layer area does not sufficiently undergo shear deformation and the desired microstructure of the surface layer area cannot be formed, and the bendability and hydrogen embrittlement resistance are not sufficiently improved. Therefore, the friction coefficient μ of a roll in contact with the steel sheet in the finishing final stand during the hot rolling is set to 0.15 or more. More preferably, the friction coefficient μ is 0.20 or more. Although an upper limit of the friction coefficient μ is not limited, the rolling force increases as the friction coefficient μ increases. Therefore, the friction coefficient μ may be set to 0.40 or less.

In addition, the rolling reduction in the final stand is set to 10% or more. The rolling reduction in the final stand is preferably 12% or more. In addition, the rolling reduction in the final stand does not need to be limited from the viewpoint of the microstructure control of the surface layer area, but is preferably set to 15% or less from the viewpoint of manufacturability such as shape control.

[Coiling Step]

After cooling to the coiling temperature as described above, coiling is performed. The coiling temperature is set to 560° C. or higher and 650° C. or lower. When the coiling temperature is higher than 650° C., the microstructure of the hot-rolled steel sheet becomes a coarse ferrite-pearlite structure, and a microstructure in which carbides are finely and uniformly dispersed is not obtained. In addition, a Si-depleted layer is formed in the surface layer by internal oxidation, and the amount of solute Si in the surface layer area decreases. As a result, the bendability deteriorates. The coiling temperature is preferably 630° C. or lower, more preferably 620° C. or lower, and even more preferably 600° C. or lower.

On the other hand, when the coiling temperature is lower than 560° C., there is a possibility that transformation starts before the coiling and the microstructure of the steel sheet becomes non-uniform. In this case, in the surface layer area, the density of ferrite grains having a grain size of 15 μm or more does not become 3,000 grains/mm$^2$ or less. By setting the coiling temperature to 560° C. or higher and coiling the steel sheet before the start of transformation, the microstructure of the entire steel sheet can be made uniform. In addition, the strength of the hot-rolled steel sheet can be lowered to reduce a load during cold rolling. Therefore, the coiling temperature is 560° C. or higher. In a case where the strength of the hot-rolled steel sheet is high, a softening heat treatment such as BAF may be performed before the cold rolling.

In the manufacturing method of the cold-rolled steel sheet according to the present embodiment, the temperature of the steel sheet is caused to reach 500° C. or lower within 10 hours from the completion of the hot rolling step. By causing the temperature of the steel sheet to be 500° C. or lower within 10 hours, the formation of the Si-depleted layer in the surface layer due to internal oxidation in the hot-rolled steel sheet is suppressed (that is, a constant amount of solute Si is secured in the surface layer area). As a result, good bendability is obtained after annealing.

The time from the completion of the hot rolling step until the temperature of the steel sheet reaches 500° C. or lower is controlled by adjusting the cooling in the coiling step or cooling after the coiling. Since heat generation occurs due to transformation at around 500° C., it is not easy to reach 500° C. or lower within 10 hours by air cooling in a case of coiling at 560° C. or higher, and it is preferable to perform forced cooling (for example, water cooling). In a case where cooling is performed on the hot-rolled steel sheet (coil-shaped) after the coiling, the strength increases, the load of the cold rolling, which is a subsequent step, increases, or a cost increases. Therefore, in general, forced cooling is not performed on the hot-rolled steel sheet after the coiling. However, in order to obtain the cold-rolled steel sheet according to the present embodiment, as described above, the time from the completion of the hot rolling step until the temperature of the steel sheet reaches 500° C. or lower is set to 10 hours or shorter.

The time from the completion of the hot rolling step until the temperature of the steel sheet reaches 500° C. or lower is preferably 5 hours or shorter.

Furthermore, it is preferable that the temperature of the steel sheet is caused to reach 450° C. or lower within 10 hours from the completion of the hot rolling step, and it is more preferable that the temperature of the steel sheet is caused to reach 450° C. or lower within 8 hours from the completion of the hot rolling step.

[Cold Rolling Step]

In the cold rolling step, the hot-rolled steel sheet that has been subjected to the hot rolling is descaled by pickling or the like and then cold-rolled under the condition in which the rolling reduction (cumulative rolling reduction) is 60% or less to obtain the cold-rolled steel sheet. When the rolling reduction in the cold rolling is high, recrystallization during annealing is promoted, coarse ferrite is formed, an uniform microstructure cannot be formed in the surface layer area, so that the bendability and hydrogen embrittlement resistance deteriorate. Therefore, the rolling reduction in the cold rolling is set to 60% or less. The rolling reduction is preferably 55% or less, and more preferably 50% or less.

Although a lower limit of the rolling reduction is not limited, the rolling reduction is preferably 30% or more from the viewpoint of manufacturability.

[Annealing Step]

The cold-rolled steel sheet after the cold rolling step is subjected to a treatment such as degreasing according to a known method as necessary, is then heated to a soaking temperature of 820° C. or higher so that the average heating rate up to 750° C. becomes 3.0° C./sec or faster, and is held at the soaking temperature.

In the annealing step, when the average heating rate up to 750° C. is slow. Si is partitioned between ferrite and austenite, and the amount of solute Si in the surface layer decreases, so that the bendability deteriorates. Therefore, the average heating rate is set to 3.0° C./sec or higher.

On the other hand, by setting the average heating rate in the above temperature range to 50.0° C./sec or slower, excessive promotion of ferritic transformation due to refinement of austenite can be suppressed, which is advantageous in improving strength and bendability. Therefore, the average heating rate is preferably set to 50.0° C./sec or slower. The average heating rate is more preferably 30.0° C./sec or slower, and even more preferably 10.0° C./sec or slower.

The soaking temperature (annealing temperature) in the annealing step is set to 820° C. or higher. When the soaking temperature is low, austenite single-phase annealing is not performed, the volume percentage of ferrite increases, and the bendability deteriorates. The soaking temperature is preferably 830° C. or higher or 835° C. or higher. The bendability can be easily secured with a high soaking temperature. However, when the soaking temperature is too high, a manufacturing cost increases. Therefore, the soaking temperature is preferably 900° C. or lower. The soaking temperature is more preferably 880° C. or lower, and even more preferably 870° C. or lower.

A soaking time is not limited, but is preferably 30 to 450 seconds. By setting the soaking time to 30 seconds or longer, austenitizing can sufficiently proceed. Therefore, the soaking time is preferably 30 seconds or longer. On the other hand, from the viewpoint of productivity, the soaking time is preferably 450 seconds or shorter.

[Post-Annealing Cooling Step]

In order to obtain the above-described metallographic structure, the cold-rolled steel sheet after the annealing is cooled to a temperature of 50° C. or higher and 250° C. or lower (cooling stop temperature) so that both an average cooling rate in a ferritic transformation temperature range of 700° C. to 600° C. and an average cooling rate in a bainitic transformation temperature range of 450° C. to 350° C. are 5.0° C./sec or faster. When the cooling rates in the above temperature ranges are slow, the volume percentages of ferrite and bainite at the ¼ position of the sheet thickness from the surface increase, and the volume percentage of tempered martensite decreases. As a result, the tensile strength decreases, and the bendability and hydrogen embrittlement resistance deteriorate. Therefore, both the average cooling rates from 700° C. to 600° C. and from 450° C. to 350° C. are set to 5.0° C./sec or faster. The average cooling rates in the above temperature ranges are each preferably 10.0° C./sec or higher and more preferably 20.0° C./sec or higher. Upper limits of the average cooling rates in the above temperature ranges are not limited. However, when the cooling rate is fast, it is difficult to perform uniform cooling in the width direction, and a shape of the steel sheet deteriorates. Therefore, each of the average cooling rates is preferably 100° C./sec or slower.

The cooling stop temperature is set to 50° C. or higher and 250° C. or lower. When the cooling stop temperature is high, (untempered) martensite increases in the cooling after the subsequent tempering step, and the bendability and hydrogen embrittlement resistance deteriorate. Therefore, the cooling stop temperature is set to 250° C. or lower. On the other hand, when the cooling stop temperature is low, a retained austenite fraction decreases, and the uniform elongation decreases. Therefore, the cooling stop temperature is set to 50° C. or higher. The cooling stop temperature is preferably 75° C. or higher, and more preferably 100° C. or higher.

In a case of manufacturing a cold-rolled steel sheet (hot-dip galvanized steel sheet) provided with a hot-dip galvanized layer on a surface, in the post-annealing cooling step, in a state where the temperature of the cold-rolled steel sheet is higher than 425° C. and lower than 600° C., the cold-rolled steel sheet may be further immersed in a hot-dip plating bath at the same temperature to form the hot-dip galvanized layer on the surface (hot-dip galvanizing step). In addition, in a case of manufacturing a cold-rolled steel sheet (hot-dip galvannealed steel sheet) having a hot-dip galvannealed layer on a surface, an alloying treatment may be performed subsequent to the above-described hot-dip galvanizing step to alloy the plating layer into the hot-dip galvannealed layer (alloying step).

[Tempering Step]

The cold-rolled steel sheet after the post-annealing cooling step is cooled to a temperature of 50° C. or higher and 250° C. or lower so that untransformed austenite is transformed into martensite. Thereafter, the cold-rolled steel sheet is tempered at a temperature of 200° C. or higher and 350° C. or lower for 1 second or longer (tempering step), whereby a microstructure primarily containing tempered martensite is obtained at the t/4 portion.

In a case where the hot-dip galvanizing step and/or the alloying step is performed, the cold-rolled steel sheet after the hot-dip galvanizing step or the cold-rolled steel sheet after the hot-dip galvanizing step and the alloying step is cooled to a temperature of 50° C. or higher and 250° C. or lower, and then tempered at a temperature of 200° C. or higher and 350° C. or lower for 1 second or longer. When a tempering temperature is higher than 350° C., the strength of the steel sheet decreases. Therefore, the tempering temperature is set to 350° C. or lower. The tempering temperature is preferably 325° C. or lower, and more preferably 300° C. or lower. In a case where it is desired to further increase the tensile strength, it is preferable to lower the tempering temperature. For example, in a case where the tensile strength is set to 1,400 MPa or more, the tempering temperature is preferably set to 275° C. or lower, and in a case where the tensile strength is set to 1,470 MPa or more, the tempering temperature is preferably set to 250° C. or lower.

On the other hand, when the tempering temperature is lower than 200° C., the tempering becomes insufficient, and the bendability and hydrogen embrittlement resistance deteriorate. Therefore, the tempering temperature is set to 200° C. or higher. From the viewpoint of the bendability and hydrogen embrittlement resistance, the tempering temperature is preferably 220° C. or higher, and more preferably 250° C. or higher.

A tempering time may be 1 second or longer, but is preferably 5 seconds or longer, and more preferably 10 seconds or longer in order to perform a stable tempering treatment. On the other hand, in order to avoid a decrease in the strength of the steel sheet, the tempering time is preferably 750 seconds or shorter, and more preferably 500 seconds or shorter.

In the present embodiment, the term "tempering" means cooling to the above-described tempering temperature in the post-annealing cooling step and then holding at the temperature, or cooling to a temperature lower than the tempering temperature in the post-annealing cooling step, then raising the temperature to the tempering temperature, and holding at the temperature. In addition, the term "holding" means not only maintaining at a constant temperature but also allowing a temperature change of 1.0° C./sec or less within the above-described tempering temperature range (that is. 200° C. or higher and 350° C. or lower).

Examples

The present invention will be described more specifically with reference to examples.

Slabs having the chemical composition shown in Table 1 were cast. The slab after the casting was heated to 1,100° C. or higher, hot-rolled to 2.8 mm, coiled, and then cooled to room temperature. The hot rolling conditions and the coiling temperatures were as shown in Tables 2A and 2B. In addition, the time from the completion of the hot rolling to reaching 500° C. or lower and the time to reach 450° C. or lower were as shown in Tables 2A and 2B.

Thereafter, descaling was performed by pickling, cold rolling to 1.4 mm was performed, and then annealing was performed at the soaking temperature shown in Tables 2A and 2B for 120 seconds. The average heating rates up to 750° C. during annealing heating were set as shown in Tables 2A and 2B.

After the annealing, cooling to a cooling stop temperature of 50° C. or higher and 250° C. or lower was performed so that average cooling rates in a temperature range of 700° C. to 600° C. and in a temperature range of 450° C. to 350° C. were 20° C./sec or faster, and thereafter a tempering heat treatment was performed for 1 to 500 seconds at the tempering temperatures shown in Tables 2A and 2B. In a case where the cooling stop temperature was lower than the tempering temperature, tempering was performed by heating to the tempering temperature shown in Tables 2A and 2B and holding at the temperature, and in a case where the cooling stop temperature was the same as the tempering temperature, tempering was performed by cooling and then holding at the temperature.

In some of the examples, hot-dip galvanizing and/or alloying were performed during post-annealing cooling. "CR" shown in Table 5 indicates a cold-rolled steel sheet that has not been galvanized, "GI" is a hot-dip galvanized steel sheet, and "GA" is a hot-dip galvannealed steel sheet. The hot-dip galvanized steel sheet was subjected to hot-dip galvanizing of about 35 to 65 g/m$^2$ at a temperature of higher than 425° C. and lower than 600° C. The hot-dip galvannealed steel sheet was subjected to hot-dip galvanizing of about 35 to 65 g/m$^2$ at a temperature of higher than 425° C. and lower than 600° C. and then further alloying at a temperature of higher than 425° C. and lower than 600°.

From the obtained cold-rolled steel sheet, the metallographic structure of the t/4 portion, the amount of solute Si in the surface layer area, the volume percentage of ferrite in the surface layer area, the density of ferrite grains having a grain size of 15 μm or more in the surface layer area, the ratio of the amount of solute Si in the surface layer area to the amount of solute Si in the t/4 portion were obtained by the above-described methods.

The results are shown in Tables 3 and 4.

In addition, the tensile strength (TS), uniform elongation (uEl), bendability (R/t), and hydrogen embrittlement resistance were evaluated as described below. The results are shown in Table 5.

The tensile strength (TS) and the uniform elongation (uEl) were obtained by collecting a JIS No. 5 tensile test piece from the obtained cold-rolled steel sheet in a direction perpendicular to the rolling direction, and conducting a tensile test according to JIS Z 2241:2011.

The results are shown in Table 5.

The limit bend radius (R/t), which is an index of bendability, was obtained by obtaining a minimum bend radius R at which no cracking occurs when a 90° V-bending die was used and a radius R was changed at a pitch of 0.5 mm, and dividing the minimum bend radius by the sheet thickness (1.4 mm).

The following test was conducted to evaluate the hydrogen embrittlement resistance.

That is, a test piece having a mechanically ground end surface was bent into a U shape by a press bending method to prepare a U-bending test piece having a radius of 5R, the U-bending test piece was tightened with bolts to be elastically deformed so that non-bent portions were parallel to each other, and thereafter a delayed fracture acceleration test in which hydrogen was allowed to penetrate into the steel sheet was conducted by immersing the U-bending test piece in hydrochloric acid having a pH of 1. Those in which cracking did not occur even when an immersion time was 100 hours were evaluated as steel sheets having a good (OK) delayed fracture resistance property, and those in which cracking had occurred were evaluated as defective (NG). In order to remove an influence of plating, regarding a plating material, the plating layer was removed with hydrochloric acid containing an inhibitor before the test, and thereafter the hydrogen embrittlement resistance was evaluated.

As can be seen from Tables 1 to 5, all of the steels of the present invention had a TS of 1,310 MPa or more, a uEl of 5.0% or more, a limit bend radius (R/t) of 5.0 or less, and good hydrogen embriglement resistance.

Contrary to this, in test numbers (comparative examples) in which any of the chemical composition and the manufacturing method was outside of the range of the present invention and the metallographic structure and a texture were outside of the range of the present invention, any of the tensile strength, uniform elongation, and limit bend radius, and hydrogen embrittlement resistance did not achieve the target.

TABLE 1

| | Chemical composition (mass %) (remainder: Fe and impurities) | | | | | | | |
|---|---|---|---|---|---|---|---|---|
| Steel | C | Si | Mn | P | S | Al | N | Others |
| A | 0.137 | 0.43 | 1.81 | 0.009 | 0.001 | 0.032 | 0.0033 | |
| B | 0.226 | 0.34 | 2.44 | 0.010 | 0.001 | 0.033 | 0.0035 | |
| C | 0.234 | 0.99 | 1.27 | 0.009 | 0.001 | 0.029 | 0.0028 | |
| D | 0.403 | 0.42 | 3.44 | 0.008 | 0.001 | 0.031 | 0.0027 | |
| E | 0.222 | 1.54 | 1.81 | 0.009 | 0.001 | 0.037 | 0.0029 | |
| F | 0.326 | 0.82 | 3.64 | 0.010 | 0.001 | 0.032 | 0.0026 | |
| G | 0.224 | 0.77 | 2.12 | 0.008 | 0.001 | 0.114 | 0.0027 | |
| H | 0.237 | 0.73 | 2.66 | 0.009 | 0.001 | 0.033 | 0.0032 | |
| I | 0.245 | 0.74 | 2.55 | 0.008 | 0.001 | 0.032 | 0.0031 | |
| J | 0.223 | 0.74 | 2.57 | 0.010 | 0.001 | 0.034 | 0.0030 | |
| K | 0.167 | 0.75 | 3.15 | 0.009 | 0.001 | 0.032 | 0.0034 | |
| L | 0.228 | 0.75 | 2.55 | 0.009 | 0.001 | 0.032 | 0.0031 | Ni: 0.10 Cu: 0.12 V: 0.07 |
| M | 0.244 | 0.72 | 2.51 | 0.009 | 0.001 | 0.034 | 0.0033 | Ti: 0.017 Nb: 0.013 B: 0.0015 |
| N | 0.342 | 0.74 | 1.81 | 0.010 | 0.001 | 0.029 | 0.0032 | Mo: 0.06 Cr: 0.24 |
| O | 0.231 | 0.73 | 2.61 | 0.009 | 0.001 | 0.028 | 0.0029 | Bi: 0.008 REM: 0.008 |
| P | 0.234 | 0.76 | 2.47 | 0.009 | 0.001 | 0.031 | 0.0034 | Ca: 0.007 Mg: 0.0007 |

TABLE 2A

| | | Hot rolling step | | | Time from completion of hot rolling | Time from completion of hot rolling | Cold rolling | Annealing step | | Tempering step |
|---|---|---|---|---|---|---|---|---|---|---|
| Test No. | Steel | Final stand rolling temperature (° C.) | Final stand rolling reduction (%) | Final stand reduction friction coefficient μ | Coiling step Coiling temperature (° C.) | until 500° C. or lower is reached (hr) | until 450° C. or lower is reached (hr) | Cumulative rolling reduction (%) | Average heating rate to up to 750° C. (° C./s) | Soaking temperature (° C.) | Tempering temperature (° C.) |
| 1 | A | 930 | 12 | 0.25 | 610 | 5 | 7 | 50 | 5.0 | 825 | 260 |
| 2 | B | 930 | 11 | 0.25 | 590 | 5 | 7 | 50 | 5.0 | 845 | 235 |
| 3 | B | 930 | 11 | 0.25 | 640 | 5 | 7 | 50 | 5.0 | 845 | 235 |
| 4 | C | 935 | 12 | 0.25 | 630 | 5 | 7 | 50 | 5.0 | 820 | 265 |
| 5 | D | 940 | 11 | 0.25 | 615 | 5 | 7 | 50 | 5.0 | 820 | 210 |
| 6 | E | 940 | 12 | 0.25 | 640 | 5 | 7 | 50 | 5.0 | 830 | 270 |
| 7 | E | 940 | 12 | 0.25 | 570 | 5 | 7 | 50 | 5.0 | 830 | 275 |

TABLE 2A-continued

| Test No. | Steel | Hot rolling step Final stand rolling temperature (° C.) | Hot rolling step Final stand rolling reduction (%) | Hot rolling step Final stand reduction friction coefficient μ | Coiling step Coiling temperature (° C.) | Time from completion of hot rolling until 500° C. or lower is reached (hr) | Time from completion of hot rolling until 450° C. or lower is reached (hr) | Cold rolling step Cumulative rolling reduction (%) | Annealing step Average heating rate to up to 750° C. (° C./s) | Annealing step Soaking temperature (° C.) | Tempering step Tempering temperature (° C.) |
|---|---|---|---|---|---|---|---|---|---|---|---|
| 8 | F | 930 | 13 | 0.25 | 600 | 5 | 7 | 50 | 5.0 | 835 | 250 |
| 9 | G | 930 | 12 | 0.25 | 610 | 5 | 7 | 50 | 5.0 | 830 | 225 |
| 10 | H | 945 | 12 | 0.25 | 575 | 5 | 7 | 50 | 5.0 | 855 | 260 |
| 11 | H | 940 | 12 | 0.25 | 610 | 5 | 7 | 50 | 5.0 | 810 | 265 |
| 12 | H | 965 | 12 | 0.25 | 610 | 5 | 7 | 50 | 5.0 | 825 | 260 |
| 13 | H | 940 | 8 | 0.25 | 620 | 5 | 7 | 50 | 5.0 | 825 | 265 |
| 14 | H | 930 | 11 | 0.10 | 615 | 5 | 7 | 50 | 5.0 | 825 | 260 |
| 15 | H | 930 | 12 | 0.25 | 660 | 5 | 7 | 50 | 5.0 | 830 | 280 |
| 16 | H | 930 | 13 | 0.25 | 680 | 5 | 7 | 50 | 5.0 | 825 | 285 |
| 17 | H | 960 | 12 | 0.20 | 570 | 11 | 14 | 50 | 5.0 | 840 | 245 |
| 18 | H | 955 | 11 | 0.20 | 550 | 5 | 7 | 50 | 5.0 | 835 | 245 |
| 19 | H | 935 | 13 | 0.20 | 570 | 5 | 7 | 50 | 5.0 | 850 | 245 |
| 20 | H | 935 | 14 | 0.25 | 570 | 5 | 7 | 50 | 5.0 | 850 | 245 |

TABLE 2B

| Test No. | Steel | Hot rolling step Final stand rolling temperature (° C.) | Hot rolling step Final stand rolling reduction (%) | Hot rolling step Final stand reduction friction coefficient μ | Coiling step Coiling temperature (° C.) | Time from completion of hot rolling until 500° C. or lower is reached (hr) | Time from completion of hot rolling until 450° C. or lower is reached (hr) | Cold rolling step Cumulative rolling reduction (%) | Annealing step Average heating rate to up to 750° C. (° C./s) | Annealing step Soaking temperature (° C.) | Tempering step Tempering temperature (° C.) |
|---|---|---|---|---|---|---|---|---|---|---|---|
| 21 | H | 930 | 13 | 0.25 | 590 | 5 | 7 | 50 | 5.0 | 825 | 250 |
| 22 | H | 920 | 11 | 0.25 | 610 | 5 | 7 | 50 | 5.0 | 830 | 255 |
| 23 | H | 920 | 12 | 0.25 | 600 | 5 | 7 | 50 | 5.0 | 830 | 300 |
| 24 | H | 935 | 12 | 0.25 | 590 | 5 | 7 | 50 | 5.0 | 850 | 220 |
| 25 | H | 940 | 13 | 0.25 | 590 | 5 | 7 | 50 | 5.0 | 835 | 280 |
| 26 | H | 930 | 11 | 0.25 | 595 | 5 | 7 | 50 | 5.0 | 845 | 260 |
| 27 | H | 930 | 12 | 0.25 | 595 | 5 | 7 | 50 | 5.0 | 840 | 250 |
| 28 | H | 935 | 13 | 0.25 | 580 | 5 | 7 | 50 | 5.0 | 830 | 305 |
| 29 | I | 935 | 13 | 0.25 | 575 | 5 | 7 | 50 | 5.0 | 840 | 245 |
| 30 | J | 940 | 12 | 0.25 | 595 | 5 | 7 | 50 | 5.0 | 845 | 230 |
| 31 | K | 930 | 12 | 0.25 | 610 | 5 | 7 | 50 | 5.0 | 855 | 325 |
| 32 | L | 920 | 12 | 0.25 | 600 | 5 | 7 | 50 | 5.0 | 845 | 240 |
| 33 | M | 930 | 13 | 0.25 | 620 | 5 | 7 | 50 | 5.0 | 845 | 240 |
| 34 | M | 930 | 12 | 0.25 | 570 | 5 | 7 | 50 | 5.0 | 840 | 245 |
| 35 | N | 920 | 13 | 0.20 | 595 | 5 | 7 | 50 | 5.0 | 845 | 210 |
| 36 | O | 930 | 12 | 0.25 | 615 | 5 | 7 | 50 | 5.0 | 835 | 245 |
| 37 | O | 930 | 13 | 0.25 | 635 | 5 | 7 | 50 | 5.0 | 840 | 240 |
| 38 | P | 930 | 13 | 0.25 | 625 | 5 | 7 | 50 | 5.0 | 840 | 230 |
| 39 | P | 935 | 12 | 0.25 | 600 | 5 | 7 | 50 | 5.0 | 840 | 235 |
| 40 | P | 925 | 13 | 0.25 | 610 | 5 | 7 | 50 | 5.0 | 845 | 230 |

TABLE 3

| | t/4 portion Metallographic structure (% indicates volume percentage) | | | | | | |
|---|---|---|---|---|---|---|---|
| Test No. | Ferrite (%) | Bainite (%) | Ferrite and bainite in total (%) | Retained austenite (%) | Martensite (%) | Tempered martensite (%) | Remainder (%) |
| 1 | 10.8 | 6.1 | 16.9 | 3.4 | 0.0 | 79.7 | 0.0 |
| 2 | 0.0 | 6.2 | 6.2 | 2.2 | 0.0 | 91.6 | 0.0 |

TABLE 3-continued

| | t/4 portion Metallographic structure (% indicates volume percentage) | | | | | | |
|---|---|---|---|---|---|---|---|
| Test No. | Ferrite (%) | Bainite (%) | Ferrite and bainite in total (%) | Retained austenite (%) | Martensite (%) | Tempered martensite (%) | Remainder (%) |
| 3 | 0.0 | 6.3 | 6.3 | 2.1 | 0.0 | 91.6 | 0.0 |
| 4 | 5.6 | 17.2 | 22.8 | 5.3 | 0.0 | 71.9 | 0.0 |
| 5 | 0.0 | 0.0 | 0.0 | 7.6 | 5.3 | 87.1 | 0.0 |
| 6 | 22.2 | 22.9 | 45.1 | 10.5 | 7.8 | 36.6 | 0.0 |
| 7 | 21.3 | 24.1 | 45.4 | 10.3 | 7.5 | 36.8 | 0.0 |
| 8 | 0.0 | 0.0 | 0.0 | 6.2 | 6.2 | 87.6 | 0.0 |
| 9 | 24.9 | 0.0 | 24.9 | 6.1 | 0.0 | 69.0 | 0.0 |
| 10 | 0.0 | 8.2 | 8.2 | 5.2 | 0.0 | 86.6 | 0.0 |
| 11 | 20.4 | 0.0 | 20.4 | 5.6 | 1.3 | 67.6 | 5.1 |
| 12 | 8.6 | 3.8 | 12.4 | 6.3 | 1.2 | 80.1 | 0.0 |
| 13 | 8.4 | 3.6 | 12.0 | 6.2 | 1.3 | 80.5 | 0.0 |
| 14 | 8.5 | 4.1 | 12.6 | 5.2 | 1.4 | 80.8 | 0.0 |
| 15 | 6.4 | 2.5 | 8.9 | 5.3 | 0.9 | 84.9 | 0.0 |
| 16 | 6.6 | 2.9 | 9.5 | 5.4 | 0.8 | 84.3 | 0.0 |
| 17 | 0.0 | 2.4 | 2.4 | 5.4 | 0.0 | 92.2 | 0.0 |
| 18 | 0.0 | 3.7 | 3.7 | 5.5 | 0.0 | 90.8 | 0.0 |
| 19 | 0.0 | 0.5 | 0.5 | 5.3 | 0.0 | 94.2 | 0.0 |
| 20 | 0.0 | 0.0 | 0.0 | 5.1 | 0.0 | 94.9 | 0.0 |
| 21 | 8.2 | 3.9 | 12.1 | 5.2 | 1.4 | 80.2 | 1.1 |
| 22 | 6.3 | 2.8 | 9.1 | 5.3 | 0.0 | 85.0 | 0.6 |
| 23 | 6.2 | 2.6 | 8.8 | 5.4 | 0.0 | 85.8 | 0.0 |
| 24 | 0.0 | 0.0 | 0.0 | 5.5 | 0.0 | 94.5 | 0.0 |
| 25 | 4.5 | 2.4 | 6.9 | 5.4 | 0.0 | 87.7 | 0.0 |
| 26 | 1.9 | 1.2 | 3.1 | 5.2 | 0.0 | 91.7 | 0.0 |
| 27 | 3.1 | 1.5 | 4.6 | 5.1 | 0.0 | 90.3 | 0.0 |
| 28 | 6.1 | 2.8 | 8.9 | 5.2 | 0.0 | 83.7 | 2.2 |
| 29 | 2.1 | 0.6 | 2.7 | 5.2 | 0.0 | 92.1 | 0.0 |
| 30 | 0.4 | 0.0 | 0.4 | 5.4 | 0.0 | 94.2 | 0.0 |
| 31 | 0.0 | 0.5 | 0.5 | 5.5 | 0.0 | 94.0 | 0.0 |
| 32 | 2.4 | 0.7 | 3.1 | 5.3 | 0.0 | 91.6 | 0.0 |
| 33 | 2.6 | 1.3 | 3.9 | 5.1 | 0.0 | 91.0 | 0.0 |
| 34 | 2.3 | 0.7 | 3.0 | 5.2 | 0.0 | 91.8 | 0.0 |
| 35 | 3.3 | 1.7 | 5.0 | 7.4 | 2.7 | 83.8 | 1.1 |
| 36 | 6.8 | 3.2 | 10.0 | 5.2 | 0.0 | 84.8 | 0.0 |
| 37 | 6.3 | 3.1 | 9.4 | 5.4 | 0.0 | 85.2 | 0.0 |
| 38 | 3.6 | 2.6 | 6.2 | 5.3 | 0.0 | 88.5 | 0.0 |
| 39 | 3.5 | 2.4 | 5.9 | 5.2 | 0.0 | 88.9 | 0.0 |
| 40 | 3.8 | 2.6 | 6.4 | 5.0 | 0.0 | 88.6 | 0.0 |

TABLE 4

| | Surface layer area (25 μm position) | | | |
|---|---|---|---|---|
| Test No. | Amount of solute Si (mass %) | Ratio of amount of solute Si in surface layer area to amount of solute Si in t/4 portion | Metallographic structure (% indicates volume percentage) | |
| | | | Ferrite (%) | Density of ferrite grains having a grain size of 15 μm or more (grains/mm²) |
| 1 | 0.40 | 0.93 | 16.1 | 2560 |
| 2 | 0.33 | 0.97 | 0.0 | 0 |
| 3 | 0.28 | 0.82 | 14.3 | 2430 |
| 4 | 0.81 | 0.82 | 9.7 | 1500 |
| 5 | 0.41 | 0.98 | 0.0 | 0 |
| 6 | 1.21 | 0.79 | 36.7 | 3970 |
| 7 | 1.51 | 0.98 | 21.8 | 3120 |
| 8 | 0.81 | 0.99 | 0.0 | 0 |
| 9 | 0.71 | 0.92 | 30.9 | 3480 |
| 10 | 0.71 | 0.97 | 0.0 | 0 |
| 11 | 0.66 | 0.90 | 32.5 | 3800 |
| 12 | 0.60 | 0.82 | 21.4 | 3030 |
| 13 | 0.61 | 0.84 | 20.9 | 3060 |
| 14 | 0.60 | 0.82 | 20.6 | 3050 |
| 15 | 0.60 | 0.82 | 20.4 | 3100 |
| 16 | 0.55 | 0.75 | 20.4 | 3020 |
| 17 | 0.57 | 0.78 | 20.3 | 3050 |
| 18 | 0.68 | 0.93 | 16.6 | 3020 |
| 19 | 0.70 | 0.96 | 0.0 | 0 |
| 20 | 0.70 | 0.96 | 0.0 | 0 |
| 21 | 0.70 | 0.96 | 9.8 | 1500 |
| 22 | 0.69 | 0.95 | 7.9 | 1200 |
| 23 | 0.68 | 0.93 | 7.8 | 1150 |
| 24 | 0.70 | 0.96 | 0.0 | 0 |
| 25 | 0.70 | 0.96 | 6.1 | 950 |
| 26 | 0.70 | 0.96 | 2.4 | 510 |
| 27 | 0.70 | 0.96 | 5.6 | 920 |
| 28 | 0.70 | 0.96 | 7.8 | 990 |
| 29 | 0.70 | 0.96 | 3.6 | 780 |
| 30 | 0.70 | 0.95 | 3.5 | 730 |
| 31 | 0.70 | 0.93 | 0.0 | 0 |
| 32 | 0.70 | 0.93 | 3.6 | 750 |
| 33 | 0.65 | 0.90 | 3.8 | 720 |
| 34 | 0.70 | 0.97 | 3.5 | 700 |
| 35 | 0.70 | 0.95 | 4.6 | 760 |
| 36 | 0.67 | 0.92 | 8.1 | 1030 |

TABLE 4-continued

| | Surface layer area (25 μm position) | | | |
|---|---|---|---|---|
| | | | Metallographic structure (% indicates volume percentage) | |
| | | Ratio of amount of solute Si in surface layer area to amount of solute Si in t/4 portion | | Density of ferrite grains having a grain size of 15 μm or more (grains/mm$^2$) |
| Test No. | Amount of solute Si (mass %) | | Ferrite (%) | |
| 37 | 0.63 | 0.86 | 8.0 | 1050 |
| 38 | 0.65 | 0.89 | 5.1 | 750 |
| 39 | 0.72 | 0.95 | 5.0 | 720 |
| 40 | 0.71 | 0.93 | 4.7 | 680 |

TABLE 5

| Test No. | Presence or absence of plating CR/GI/GA | Mechanical properties | | | | Note |
|---|---|---|---|---|---|---|
| | | TS (MPa) | Uniform elongation (%) | Limit bend radius (R/t) | Hydrogen embrittlement resistance | |
| 1 | CR | 1225 | 5.3 | 5.4 | OK | Comparative Example |
| 2 | CR | 1560 | 4.8 | 4.6 | OK | Comparative Example |
| 3 | CR | 1545 | 4.9 | 5.4 | NG | Comparative Example |
| 4 | CR | 1305 | 7.2 | 5.4 | OK | Comparative Example |
| 5 | CR | 1976 | 6.6 | 6.1 | NG | Comparative Example |
| 6 | CR | 891 | 16.4 | 5.4 | OK | Comparative Example |
| 7 | CR | 897 | 16.1 | 5.4 | OK | Comparative Example |
| 8 | GA | 1614 | 6.3 | 6.1 | NG | Comparative Example |
| 9 | CR | 1306 | 7.7 | 3.9 | OK | Comparative Example |
| 10 | CR | 1473 | 6.4 | 2.5 | OK | Invention Example |
| 11 | GA | 1308 | 7.2 | 6.1 | OK | Comparative Example |
| 12 | CR | 1441 | 6.8 | 5.4 | NG | Comparative Example |
| 13 | GA | 1446 | 6.6 | 5.4 | NG | Comparative Example |
| 14 | CR | 1449 | 6.7 | 5.4 | NG | Comparative Example |
| 15 | GA | 1455 | 6.5 | 5.4 | NG | Comparative Example |
| 16 | CR | 1450 | 6.7 | 5.4 | NG | Comparative Example |
| 17 | CR | 1557 | 6.4 | 5.4 | NG | Comparative Example |
| 18 | GA | 1552 | 6.5 | 5.4 | NG | Comparative Example |
| 19 | GA | 1566 | 6.4 | 4.3 | OK | Invention Example |
| 20 | CR | 1558 | 6.2 | 2.5 | OK | Invention Example |
| 21 | GA | 1456 | 6.6 | 2.9 | OK | Invention Example |
| 22 | CR | 1472 | 6.4 | 2.5 | OK | Invention Example |
| 23 | GA | 1450 | 6.4 | 4.3 | OK | Invention Example |
| 24 | CR | 1577 | 6.0 | 2.1 | OK | Invention Example |
| 25 | CR | 1466 | 6.8 | 4.3 | OK | Invention Example |
| 26 | GA | 1495 | 6.5 | 2.9 | OK | Invention Example |
| 27 | CR | 1480 | 6.4 | 2.5 | OK | Invention Example |
| 28 | CR | 1443 | 6.4 | 2.9 | OK | Invention Example |
| 29 | GA | 1475 | 6.3 | 2.5 | OK | Invention Example |
| 30 | GA | 1572 | 6.2 | 2.1 | OK | Invention Example |
| 31 | CR | 1379 | 7.1 | 2.9 | OK | Invention Example |
| 32 | CR | 1479 | 6.5 | 2.5 | OK | Invention Example |
| 33 | GA | 1480 | 6.3 | 2.5 | OK | Invention Example |
| 34 | CR | 1489 | 6.2 | 2.5 | OK | Invention Example |
| 35 | CR | 1860 | 6.2 | 3.9 | OK | Invention Example |
| 36 | GA | 1475 | 6.3 | 3.2 | OK | Invention Example |
| 37 | CR | 1493 | 6.3 | 3.2 | OK | Invention Example |
| 38 | GA | 1485 | 6.3 | 2.5 | OK | Invention Example |
| 39 | GI | 1483 | 6.5 | 2.9 | OK | Invention Example |
| 40 | GI | 1493 | 6.2 | 3.2 | OK | Invention Example |

INDUSTRIAL APPLICABILITY

According to the present invention, a cold-rolled steel sheet having high strength and excellent uniform elongation, bendability, and hydrogen embrittlement resistance and a method for manufacturing the same can be obtained, Since such a steel sheet has sufficient formability that can be applied to processing such as press forming, the present invention can contribute to solving global environmental problems through a reduction in weight of a vehicle body, and thus greatly contributes to the development of industry.

What is claimed is:

1. A cold-rolled steel sheet comprising, as a chemical composition, by mass %:
C: 0.140% or more and 0.400% or less;
Si: 0.35% or more and 1.50% or less;
Mn: 1.30% or more and 3.50% or less;
P: 0% or more and 0.100% or less;
S: 0% or more and 0.010% or less;
Al: 0% or more and 0.100% or less;
N: 0% or more and 0.0100% or less;
Ti: 0% or more and 0.050% or less;
Nb: 0% or more and 0.050% or less;
V: 0% or more and 0.50% or less;
Cu: 0% or more and 1.00% or less;
Ni: 0% or more and 1.00% or less;
Cr: 0% or more and 1.00% or less;
Mo: 0% or more and 0.50% or less;
B: 0% or more and 0.0100% or less;
Ca: 0% or more and 0.010% or less;
Mg: 0% or more and 0.0100% or less;
REM: 0% or more and 0.050% or less;
Bi: 0% or more and 0.050% or less; and
a remainder of Fe and impurities, wherein a metallographic structure of a t/4 portion, which is at a 1/4 position of a sheet thickness t from a surface of the cold-rolled steel sheet in a sheet thickness direction, includes, by volume percentage,
retained austenite: 2.5% or more and 10.0% or less,
tempered martensite: 80.0% or more and 97.5% or less,
ferrite and bainite: 0.0% or more and 15.0% or less in total, and
martensite: 0.0% or more and 3.0% or less, and
in a surface layer area at a position 25 μm away from the surface of the cold-rolled steel sheet in the sheet thickness direction,
an amount of solute Si is 0.30% or more and 1.50% or less by mass %,
a volume percentage of ferrite in a metallographic structure is 0.0% or more and 20.0% or less,
a density of ferrite grains having a grain size of 15 μm or more is 0 grains/mm$^2$ or more and 3,000 grains/mm$^2$ or less, and
a ratio of the amount of the solute Si in the surface layer area to an amount of solute Si in the t/4 portion is 0.85 to 1.10.

2. The cold-rolled steel sheet according to claim 1, comprising, as the chemical composition, by mass %, one or more of:
Ti: 0.001% or more and 0.050% or less;
Nb: 0.001% or more and 0.050% or less;
V: 0.01% or more and 0.50% or less;
Cu: 0.01% or more and 1.00% or less;
Ni: 0.01% or more and 1.00% or less;
Cr: 0.01% or more and 1.00% or less;
Mo: 0.01% or more and 0.50% or less;
B: 0.0001% or more and 0.0100% or less;
Ca: 0.0001% or more and 0.010% or less;
Mg: 0.0001% or more and 0.0100% or less;
REM: 0.0005% or more and 0.050% or less; and
Bi: 0.0005% or more and 0.050% or less.

3. The cold-rolled steel sheet according to claim 2,
wherein a tensile strength of the cold-rolled steel sheet is 1,310 MPa or more,
a uniform elongation of the cold-rolled steel sheet is 5.0% or more, and
R/t, which is a value obtained by dividing a limit bend radius R in 90° V-bending by the sheet thickness t, is 5.0 or less.

4. The cold-rolled steel sheet according to claim 3,
wherein a hot-dip galvanized layer is formed on the surface.

5. The cold-rolled steel sheet according to claim 4,
wherein the hot-dip galvanized layer is a hot-dip galvannealed layer.

6. The cold-rolled steel sheet according to claim 1,
wherein a tensile strength of the cold-rolled steel sheet is 1,310 MPa or more,
a uniform elongation of the cold-rolled steel sheet is 5.0% or more, and
R/t, which is a value obtained by dividing a limit bend radius R in 90° V-bending by the sheet thickness t, is 5.0 or less.

7. The cold-rolled steel sheet according to claim 6,
wherein the tensile strength is 1,400 MPa or more.

8. The cold-rolled steel sheet according to claim 6,
wherein a hot-dip galvanized layer is formed on the surface.

9. The cold-rolled steel sheet according to claim 8,
wherein the hot-dip galvanized layer is a hot-dip galvannealed layer.

10. The cold-rolled steel sheet according to claim 1,
wherein a hot-dip galvanized layer is formed on the surface.

11. The cold-rolled steel sheet according to claim 10,
wherein the hot-dip galvanized layer is a hot-dip galvannealed layer.

12. A method for manufacturing the cold-rolled steel sheet according to claim 1, the method comprising:
a hot rolling process of heating a cast slab containing, as the chemical composition, by mass %, C: 0.140% or more and 0.400% or less, Si: 0.35% or more and 1.50% or less, Mn: 1.30% or more and 3.50% or less, P: 0% or more and 0.100% or less, S: 0% or more and 0.010% or less, Al: 0% or more and 0.100% or less, N: 0% or more and 0.0100% or less, Ti: 0% or more and 0.050% or less, Nb: 0% or more and 0.050% or less, V: 0% or more and 0.50% or less, Cu: 0% or more and 1.00% or less, Ni: 0% or more and 1.00% or less, Cr: 0% or more and 1.00% or less, Mo: 0% or more and 0.50% or less, B: 0% or more and 0.0100% or less, Ca: 0% or more and 0.010% or less, Mg: 0% or more and 0.0100% or less, REM: 0% or more and 0.050% or less, Bi: 0% or more and 0.050% or less, and a remainder of Fe and impurities, and performing hot rolling on the cast slab under conditions in which a rolling temperature FT in a final stand is 960° C. or lower, a rolling reduction in the final stand is 10% or more, and a friction coefficient μ in the final stand is 0.15 or more to obtain a hot-rolled steel sheet;
a coiling process of cooling the hot-rolled steel sheet to a coiling temperature of 560° C. or higher and 650° C. or lower and coiling the hot-rolled steel sheet at the coiling temperature;
a cold rolling process of performing cold rolling on the hot-rolled steel sheet after the coiling process under a condition in which a cumulative rolling reduction is 60% or less to obtain the cold-rolled steel sheet;
an annealing process of heating the cold-rolled steel sheet to a soaking temperature of 820° C. or higher so that an average heating rate up to 750° C. becomes 3.0° C./sec or faster, and holding the cold-rolled steel sheet at the soaking temperature;
a post-annealing cooling process of cooling the cold-rolled steel sheet after the annealing process to a temperature of 50° C. or higher and 250° C. or lower so that average cooling rates in a temperature range of 700° C. to 600° C. and in a temperature range of 450° C. to 350° C. are 5.0° C./sec or faster; and
a tempering process of holding the cold-rolled steel sheet after the post-annealing cooling process at 200° C. or higher and 350° C. or lower for 1 second or longer,
wherein a temperature of the hot-rolled steel sheet after the hot rolling process is caused to reach 500° C. or lower within 5 hours from completion of the hot rolling process.

13. The method for manufacturing the cold-rolled steel sheet according to claim 12,
wherein the cast slab contains, as the chemical composition, by mass %, one or more of:
Ti: 0.001% or more and 0.050% or less;
Nb: 0.001% or more and 0.050% or less;
V: 0.01% or more and 0.50% or less;
Cu: 0.01% or more and 1.00% or less;
Ni: 0.01% or more and 1.00% or less;
Cr: 0.01% or more and 1.00% or less;
Mo: 0.01% or more and 0.50% or less;
B: 0.0001% or more and 0.0100% or less;

Ca: 0.0001% or more and 0.010% or less;
Mg: 0.0001% or more and 0.0100% or less;
REM: 0.0005% or more and 0.050% or less; and
Bi: 0.0005% or more and 0.050% or less.

14. The method for manufacturing the cold-rolled steel sheet according to claim 12,
wherein, in the post-annealing cooling process, the cold-rolled steel sheet is immersed in a plating bath in a state where a temperature of the cold-rolled steel sheet is higher than 425° C. and lower than 600° C. to form a hot-dip galvanized layer on the surface of the cold-rolled steel sheet.

15. The method for manufacturing the cold-rolled steel sheet according to claim 14,
wherein an alloying treatment for alloying the hot-dip galvanized layer is performed in the post-annealing cooling process.

* * * * *